United States Patent [19]

Waltrich

[11] Patent Number: 5,450,392
[45] Date of Patent: Sep. 12, 1995

[54] REDUCTION OF INTERCHANNEL HARMONIC DISTORTIONS IN AN ANALOG AND DIGITAL SIGNAL MULTIPLEX

[75] Inventor: Joseph B. Waltrich, Glenside, Pa.

[73] Assignee: General Instrument Corporation, Hatboro, Pa.

[21] Appl. No.: 877,824

[22] Filed: May 1, 1992

[51] Int. Cl.⁶ ............................ H04H 1/04; H04J 1/12
[52] U.S. Cl. ............................................. 370/6; 348/6; 348/21; 370/73; 455/6.1
[58] Field of Search .............. 455/6.1, 6.3, 68, 69, 455/3.1, 103, 295; 358/142, 425; 370/38, 39, 40, 69.1, 71, 72, 73, 76, 120, 123, 6, 121, 124; 348/6, 21, 471, 473

[56] References Cited

U.S. PATENT DOCUMENTS

| | | | |
|---|---|---|---|
| 3,108,158 | 10/1963 | Jones | 370/76 |
| 3,315,164 | 4/1967 | Ferguson, Jr. et al. | 455/69 |
| 3,794,923 | 2/1974 | Ellis | 455/6.1 |
| 4,757,495 | 7/1988 | Decker et al. | 370/76 |
| 4,914,651 | 4/1990 | Lusignan | 370/69.1 |
| 4,937,821 | 6/1990 | Boulton | 370/73 |
| 5,150,365 | 9/1992 | Hirata et al. | 370/76 |
| 5,293,633 | 3/1994 | Robbins | 455/6.1 |

OTHER PUBLICATIONS

Citta, et al., "The Digital Spectrum-Compatable HDTV Transmission System," IEEE 1991 International Conference on Consumer Electronics ICCE, Jun. 5–7, 1991, Rosemont, Ill., pp. 44–45.

Laflin, et al., "The Provision of Circuits to Outside Broadcast Locations Using Spectrum Within the UHF Broadcasting Bands," BBC Research Department Report, No. 12, 1990, Tadworth, Great Britain, pp. 1–21.

Primary Examiner—Benedict V. Safourek
Attorney, Agent, or Firm—Barry R. Lipsitz

[57] ABSTRACT

A frequency allocation is provided to minimize the effects of amplifier distortion in a mixed analog and digital cable television system. In particular, successive digital channel signals having a bandwidth substantially equal to $\omega$ are separated by a pair of adjacent analog channel signals, each having a bandwidth substantially equal to $\omega$. In an illustrated embodiment, the analog and digital channel signals comprise amplitude modulated carriers having substantially equal power levels.

14 Claims, 3 Drawing Sheets

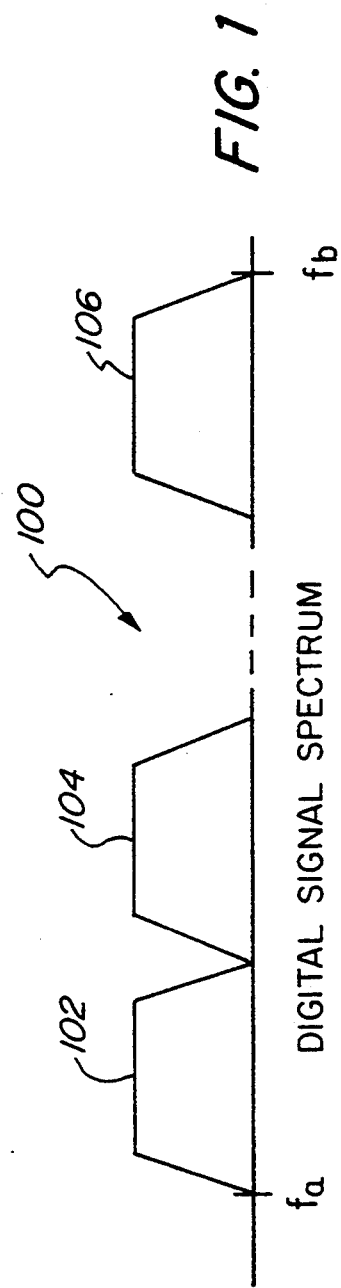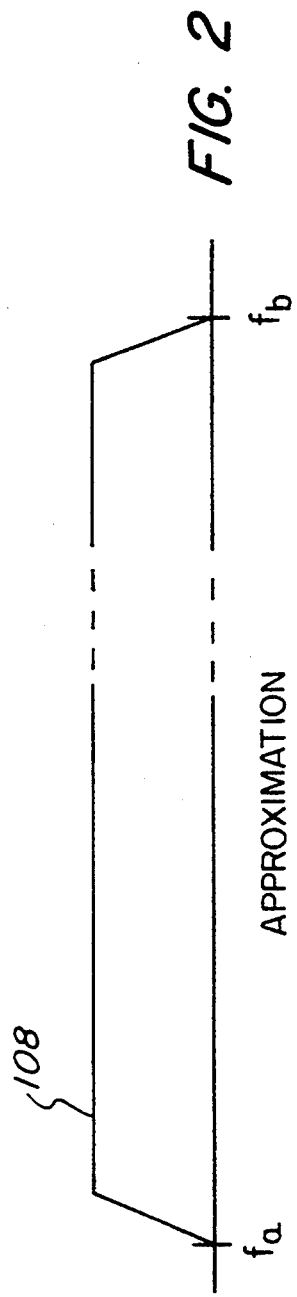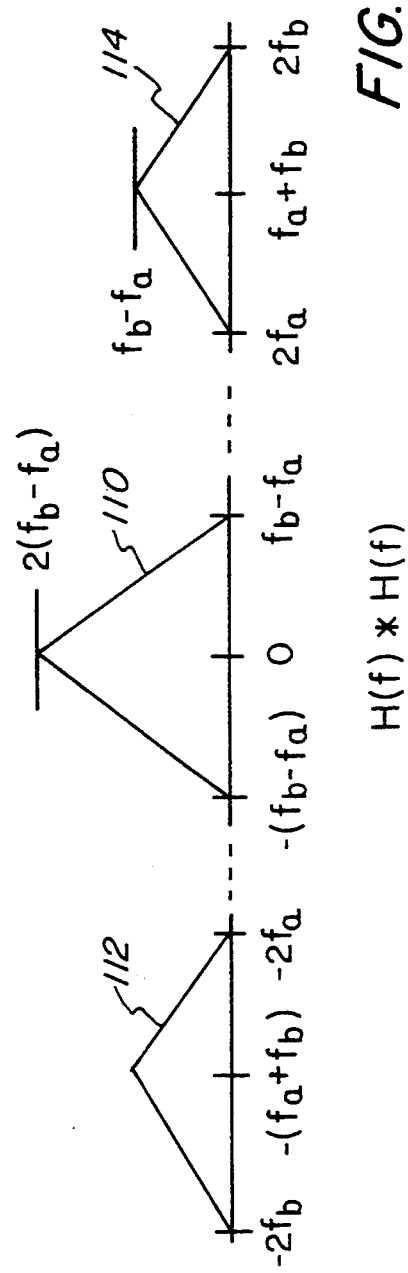

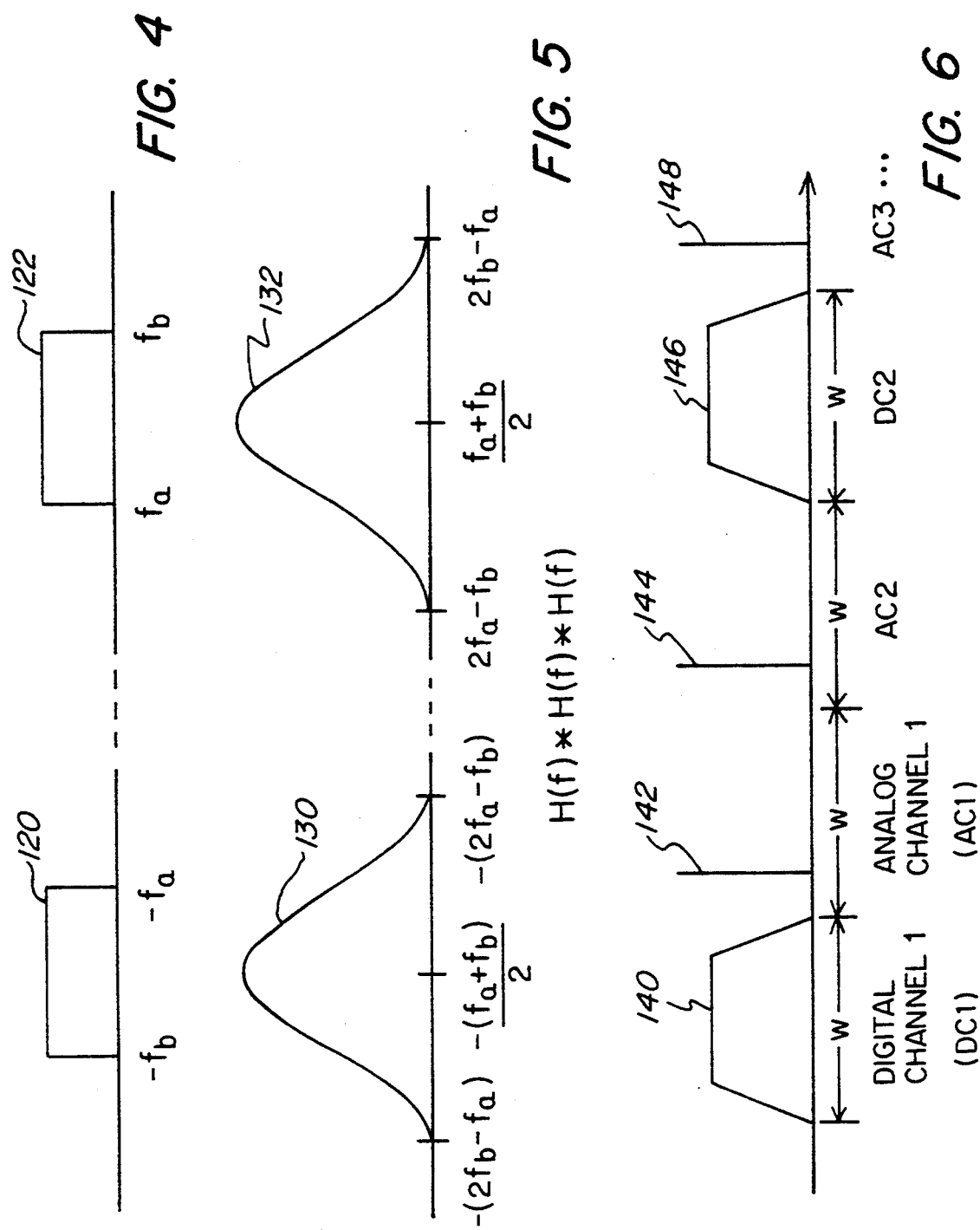

REDUCTION OF INTERCHANNEL HARMONIC DISTORTIONS IN AN ANALOG AND DIGITAL SIGNAL MULTIPLEX

BACKGROUND OF THE INVENTION

The present invention relates to the communication of analog and digital channel signals, and more particularly to a frequency allocation technique that minimizes the effects of amplifier distortion in a mixed analog and digital cable television system.

Cable television systems can be built to cover a wide geographic area and/or a large subscriber population by establishing a number of distribution hubs. Signals from the cable headend can be carried to the hubs by coaxial cable, microwave or, more recently, optical fibers. A major advantage in using optical fibers is that the signal transmission quality is greatly enhanced in comparison with coaxial cable distribution, which suffers from distortion introduced by amplifiers that must be provided along a coaxial cable path. Although low distortion "feed forward" amplifiers have been developed for the communication of analog signals via coaxial cable, substantial intermodulation products can result when such amplifiers are used to carry digital signals as well as analog signals. Such intermodulation products result from the mixing of different signals on the cable, and generate interference in the distributed television signals.

With the advent of digital processing techniques, it has become advantageous to distribute certain signals in a digital format. Indeed, it is expected that in the future, digital optical transmission will become the preferred technique for distribution of signals within and between cable systems. At rates of the order of 90 Mbits per second per video signal, digital systems will be able to provide transmission of extremely high and unvarying quality.

As the technology progresses toward total digital communications, it has become advantageous to transmit both analog and digital signals together on a cable television network. For example, certain high quality premium channels may be transmitted in a digital mode, together with other channels in a conventional analog format. However, as noted above, the transmission of digital signals together with analog signals can result in unacceptable harmonic distortions introduced by a coaxial cable distribution path, and particularly by the nonlinearities inherent in present day distribution amplifiers.

It would be advantageous to provide a technique for transmitting a multiplex of digital and analog signals via a cable television distribution network in a manner that minimizes intermodulation distortions between the various television channel signals. It would be further advantageous to provide such a technique that requires a minimal amount of additional hardware, and can be implemented in an efficient and cost effective manner.

The present invention provides a method and apparatus for reducing interchannel harmonic distortions in a multiplex of analog and digital channel signals, enjoying the aforementioned advantages.

SUMMARY OF THE INVENTION

In accordance with the present invention, a method is provided for reducing interchannel harmonic distortions in a multiplex of analog and digital channel signals. A pair of adjacent analog channel signals is provided, each having a bandwidth substantially equal to $\omega$ and each having a respective carrier frequency adapted to establish the adjacency of the pair of channel signals. A first digital channel signal is provided adjacent the pair of analog channel signals. The digital channel signal has a bandwidth substantially equal to $\omega$ and a carrier frequency that is below the carrier frequencies of the adjacent analog channel signals. A second digital channel signal is provided adjacent the pair of analog channel signals. The second digital channel signal has a bandwidth substantially equal to $\omega$ and a carrier frequency that is above those of the adjacent analog channel signals. The analog and digital channel signals are multiplexed to provide a multiplex for communication over a common communications channel. The multiplex carries the first and second digital channels separated by the pair of adjacent analog channel signals.

Additional analog and digital channel signals can be provided in the multiplex. In this case, successive digital channel signals in the multiplex are separated by at least two adjacent analog channel signals. In a preferred embodiment, the power levels of the analog and digital channel signals are maintained such that they are substantially equal.

Apparatus in accordance with the present invention transmits a multiplex of analog and digital channel signals without substantial interchannel harmonic distortion. Means are provided for modulating a first carrier of a frequency $f_1$ to provide a first analog channel signal having a bandwidth substantially equal to $\omega$. A second carrier of a frequency $f_2$ is modulated to provide a second analog channel signal having a bandwidth substantially equal to $\omega$, wherein $f_1$ and $f_2$ are selected such that the first and second analog channel signals will be adjacent within the multiplex. Means are provided for modulating a third carrier of a frequency $f_3$, which is below the frequencies of $f_1$ and $f_2$, to provide a first digital channel signal adjacent and below the pair of analog channel signals. The first digital channel signal has a bandwidth substantially equal to $\omega$. A fourth carrier of a frequency $f_4$ (which is above the frequencies $f_1$ and $f_2$) is modulated to provide a second digital channel signal adjacent and above the pair of analog channel signals. The second digital channel signal has a bandwidth substantially equal to $\omega$. The analog and digital channel signals are combined to provide a multiplex for transmission over a communications path, wherein the first and second digital channel signals are separated in the multiplex by the pair of adjacent analog channel signals.

The apparatus of the present invention can further include means for providing additional analog and digital channel signals in the multiplex. Successive digital channel signals in the multiplex are separated by at least two adjacent analog channel signals. In a preferred embodiment, the power levels of the analog and digital channel signals are maintained substantially equal. In an illustrated embodiment, the analog and digital channel signals comprise amplitude modulated carriers.

BRIEF DESCRIPTION OF THE DRAWINGS

FIG. 1 is an illustration of a broadband input spectrum containing multiple digital channels;

FIG. 2 is a simplified representation of the signal spectrum of FIG. 1, wherein the digital signals are viewed as a single continuous spectrum;

FIG. 3 is an illustration showing the convolution of the input spectrum of FIG. 1 with itself, said convolution producing a set of triangular spectra;

FIG. 4 is an illustration of an original digital signal spectrum;

FIG. 5 is an illustration of the spectrum of third order distortion generated by the original spectrum of FIG. 4, showing that the third order distortion covers a frequency range that is three times wider than the original digital signal spectrum;

FIG. 6 is an illustration showing a frequency allocation of analog and digital channels to provide minimum distortion in accordance with the present invention.

DETAILED DESCRIPTION OF THE INVENTION

Figure 7:
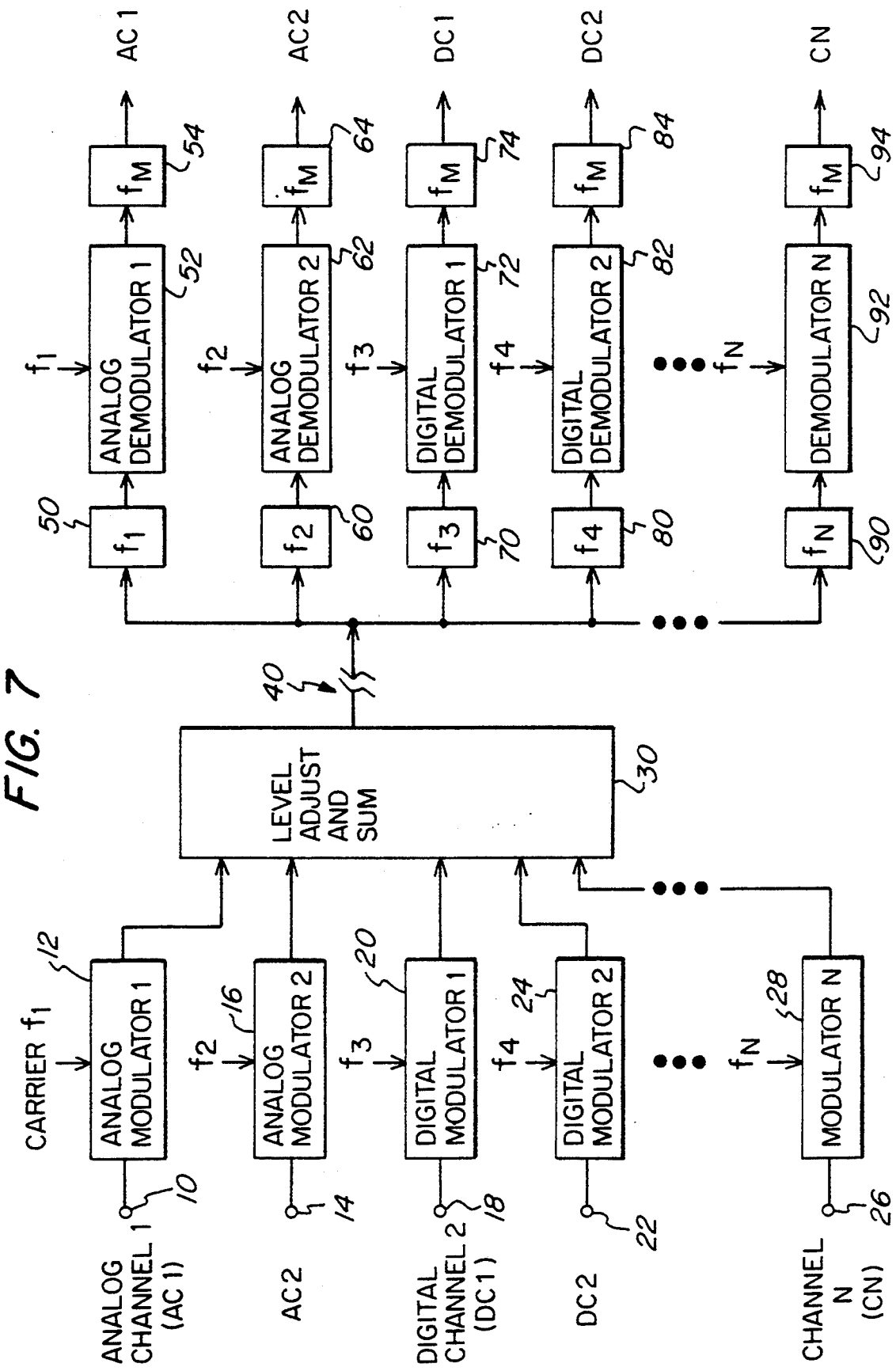
FIG. 7 is a block diagram of apparatus in accordance with the present invention.

Amplifiers used in cable TV systems are not perfectly linear. This nonlinearity results in an output signal that contains harmonic distortions. The effect of these distortions in the time domain may be expressed mathematically by the following equation:

$$e_o(t) = k_1 e_i(t) + k_2 e_i(t)^2 + k_3 e_i(t)^3$$

where:
 $e_o(t)$ = amplifier output voltage
 $e_i(t)$ = amplifier input voltage
 $k_1$ = amplifier gain
 $k_2, k_3$ = constants which define the
second and third order distortion performance of the amplifier.

Since multiplication in the time domain is equivalent to convolution in the frequency domain, the spectrum of the distorted output may be obtained by convolution of the input signal with itself. This yields the following equation:

$$X(f) = k_1 H(f) + k_2 H(f)*H(f) + k_3 H(f)*H(f)*H(f)$$

where:
 $X(f)$ = distorted output spectrum
 $H(f)$ = input spectrum.

The * denotes convolution. That is, for continuous spectra:

$$S(f) = H*G = \int_{-\infty}^{\infty} H(k) G(f-k) dk$$

or, in discrete form:

$$S(f) = H*G = \sum_{k=-\infty}^{k=\infty} H(k) G(f-k).$$

For a cable system composed entirely of analog channels, the input signal spectrum is composed of equally spaced discrete carriers and the output spectrum is composed of the original signals plus frequency components that are functions of the sums and differences of the input carrier frequencies. For digital transmission, the input spectrum H(f) is a broadband spectrum generally designated 100, composed of multiple digital channels 102, 104 ... 106 as shown in FIG. 1. For purposes of simplification, the spectral notches created by the individual channel filters can be ignored. In this instance, the digital signals are treated as a single continuous spectrum 108 as shown in FIG. 2. For initial computations, it is also assumed that the digital channels are grouped together and occupy a portion of the cable spectrum between frequencies $f_a$ and $f_b$.

The convolution of H(f) with itself produces a set of triangular spectra, 110, 112, 114 as shown in FIG. 3. Mathematically, these spectra may be expressed by the following equations:

$$\begin{aligned}
G(f) = H(f)*H(f) &= 2(f_b - f_a) - 2f \quad (0 \leq f \leq (f_b - f_a)) \\
&= 2(f_b - f_a) - 2f \quad (-(f_b - f_a) \leq f \leq 0) \\
&= -2f_a + f \quad (2f_a \leq f \leq (f_a + f_b)) \\
&= 2f_b - f((f_a + f_b) \leq f \leq 2f_b) \\
&= 2f_b + f(-2f_b \leq f \leq -(f_a + f_b)) \\
&= -2f_a - f(-(f_a + f_b) \leq f \leq -2f_a).
\end{aligned}$$

The second order distortion power, expressed in dB relative to the amplifier's output is:

$$D_2(f) = 10 \log (G(f)) + k_2.$$

To obtain the third order distortion spectrum, it is necessary to convolve the input spectrum H(f) with the second order spectrum G(f). This yields a quadratic equation in terms of frequency. The convolution may be expressed by the following three equations:

$$X(f) = 1.5 f^2 - 3(2f_a - f_b) f + 1.5(2f_a - f_b)^3 (2f_a - f_b \leq f \leq f_a)$$

$$X(f) = -3 f^2 + 3(f_a + f_b) f + 1.5(f_a^2 + f_b^2 - 4 f_a f_b) \\ (f_a \leq f \leq f_b)$$

$$X(f) = 1.5 f^2 - 3(2f_b - f_a) f + 1.5(2f_b - f_a)^2 (f_b \leq f \leq 2f_b - f_a)$$

A plot of X(f) vs. frequency, based on the original spectrum 120, 122 illustrated in FIG. 4, is shown by curves 130, 132 in FIG. 5. The amplitude of the distortion is proportional to the square of the bandwidth of the digital spectrum. The convolution has the following values at discrete frequencies which are functions of $f_a$ and $f_b$:

| Frequency | Amplitude |
| --- | --- |
| $2f_a - f_b$ | 0 |
| $f_a$ | $1.5(f_b - f_a)^2$ |
| $.5(f_a + f_b)$ | $2.25(f_b - f_a)^2$ |
| $f_b$ | $1.5(f_b - f_a)^2$ |
| $2f_b - f_a$ | 0 |

From FIG. 5, it is seen that the spectrum 130, 132 of third order distortion covers a frequency range which is three times wider than the original digital signal spectrum. Therefore, the adjacent analog channels will be affected by third order distortion generated by the digital signals. The worst case distortion will occur in the analog channels immediately adjacent to the digital spectrum. The average value of the distortion in this channel is given by the equation:

$$d_3 = (1/\omega) \int_{f_a - \omega}^{f_a} X(f) df$$

for frequencies below the digital signal spectrum. For analog channels above the digital spectrum, the average value of the distortion is:

$$d_3 = (1/\omega) \int_{f_b}^{f_b+\omega} X(f) df$$

where:
$\omega$ = channel bandwidth
$d_3$ = average value of third order distortion in the adjacent analog channel.

In the National Television Systems Committee (NTSC) television format, $\omega$ is 6 MHz. In the Phase Alternating Line (PAL) format, $\omega$ is 8 MHz. The third order distortion power, expressed in dB, is:

$$D_3 = 10 \log (d_3) + k_3$$

The minimum third order distortion in adjacent channels is produced when the digital signal bandwidth is equal to the bandwidth of a single analog channel. Thus, in accordance with the present invention, successive digital channels are separated by at least two analog channels, so that the value of the distortion will be minimized for all analog channels. The preferred channel placement is illustrated in FIG. 6. As shown, digital channel signals 140 and 146 are separated by a pair of analog channel signals 142 and 144. All of the channels have the same bandwidth $\omega$. Additional analog and digital channels can be provided, wherein a pair of analog channel signals separates consecutive digital channel signals.

It is preferable to maintain the power level of the digital channels equal to the power level of the analog channels. Assuming equal power levels for the analog and digital channels, and values of $K_3 = -85$ dB for trunk amplifiers and $K_3 = -65$ dB for distribution amplifiers, the distortion produced by the channel placement illustrated in FIG. 6 will be less than $-52$ dB for NTSC channels and less than $-48$ dB for PAL channels.

FIG. 7 illustrates apparatus for practicing the present invention. A plurality of analog modulators 12, 16 and digital modulators 20, 24 are provided. Additional modulators 28, which can be analog or digital as necessary, can also be provided. The first analog modulator 12 receives first analog channel information (AC1) via terminal 10. A carrier at frequency $f_1$ is modulated by the AC1 information and the modulated carrier is input to a level adjust and channel signal summation circuit 30.

Second analog channel information (AC2) is input to a second analog modulator 16 via terminal 14. The AC2 information modulates a second carrier of frequency $f_2$, and the modulated carrier is output to the level adjust and summation circuit 30. First digital channel information (DC1) is input to a first digital modulator 20 via terminal 18, to modulate a carrier of frequency $f_3$ that is output to circuit 30. Similarly, second digital channel information (DC2) is used to modulate a carrier of frequency $f_4$ in a digital modulator 24 that receives the DC2 information via terminal 22. The resultant modulated carrier is output to circuit 30. Additional channels of analog and digital information are used to modulate additional carriers for input to circuit 30 in the same manner.

Level adjust and summation circuitry 30 comprises well known components. In a preferred embodiment, the level adjust portion of the circuitry adjusts the power of each of the modulated carriers to the same level. The signals are then summed to form a multiplex that is carried via a common communication channel 40 to a plurality of subscriber terminals. Each subscriber terminal includes a plurality of bandpass filters, each having a pass band that corresponds to the carrier frequency of one of the received carriers. Thus, bandpass filter 50 passes the carrier at frequency $f_1$. Bandpass filters 60, 70, 80, and 90 correspond to carrier frequencies $f_2$, $f_3$, $f_4$ and $f_N$, respectively. In this manner, the individual received channel signals are separated at the receiver. These signals are then applied to individual demodulators 52, 62, 72, 82, 92, which extract the baseband signals from the respective carriers. The carrier inputs to the demodulators are required for synchronous demodulation.

The final operation of the receiver portion of FIG. 7 consists of passing the demodulator outputs through respective baseband filters 54, 64, 74, 84 and 94. The baseband filters pass, without modification, the baseband signal output from the respective modulator. The bandwidth $f_M$ of these filters corresponds to the bandwidth $\omega$ of the transmitted channels. The purpose of the baseband filters is to suppress noise which invariably accompanies the received signals.

The carrier frequencies $f_1$, $f_2$, $f_3$ and $f_4$ are chosen to provide the first and second analog channel signals output from modulators 12, 16 respectively as an adjacent pair of signals (e.g., signal pair 142, 144 illustrated in FIG. 6). The carrier frequencies are also selected such that the first digital channel signal output from digital modulator 20 is adjacent and below the pair of analog channel signals with the second digital channel signal output from modulator 24 being adjacent and above the pair of analog channel signals. In this manner, a multiplex as illustrated in FIG. 6 is obtained, wherein successive digital channel signals are separated by a pair of adjacent analog channel signals. The carrier frequencies $f_N$ are chosen in a similar manner, to maintain at least two analog channel signals between successive digital channel signals.

It should now be appreciated that the present invention provides a novel frequency allocation that minimizes the effects of amplifier distortion in a mixed analog and digital cable television system. Although the invention has been described in connection with a preferred embodiment thereof, those skilled in the art will recognize that numerous adaptations and modifications may be made thereto, without departing from the spirit and scope of the invention as set forth in the claims.

What is claimed is:

1. A method for reducing interchannel harmonic distortions in a multiplex of analog and digital signals carrying different channels of information comprising the steps of:

providing a pair of adjacent analog channel signals, each having a bandwidth substantially equal to $\omega$ and a carrier frequency adapted to establish the adjacency of said pair;

providing a first digital channel signal adjacent said pair of analog channel signals, said first digital channel signal having a bandwidth substantially equal to $\omega$ and a carrier frequency below those of said adjacent analog channel signals;

providing a second digital channel signal adjacent said pair of analog channel signals, said second digital channel signal having a bandwidth substantially equal to $\omega$ and a carrier frequency above those of said adjacent analog channel signals; and combining said analog and digital channel signals to provide a multiplex of different information channels for communication over a common communications path;

wherein said multiplex carries said first and second digital channel signals separated by said pair of adjacent analog channel signals.

2. A method in accordance with claim 1 comprising the further step of:

providing additional analog and digital channel signals in said multiplex;

wherein successive digital channel signals in said multiplex are separated by at least two adjacent analog channel signals.

3. A method in accordance with claim 2 comprising the further step of maintaining the power levels of said analog and digital channel signals substantially equal.

4. A method in accordance with claim 1 comprising the further step of maintaining the power levels of said analog and digital channel signals substantially equal.

5. A method in accordance with claim 1 wherein said analog and digital channel signals comprise amplitude modulated carriers.

6. A method in accordance with claim 1 wherein said analog and digital channel signals comprise different television program signals.

7. A method in accordance with claim 6 wherein said bandwidth $\omega$ is at least about 6 MHz.

8. Apparatus for transmitting a multiplex of analog and digital signals carrying different channels of information without substantial interchannel harmonic distortions comprising:

means for modulating a first carrier of a frequency $f_1$ to provide a first analog channel signal having a bandwidth substantially equal to $\omega$;

means for modulating a second carrier of a frequency $f_2$ to provide a second analog channel signal having a bandwidth substantially equal to $\omega$, wherein $f_1$ and $f_2$ are selected to establish said first and second analog channel signals as an adjacent pair of signals;

means for modulating a third carrier of a frequency $f_3$ below $f_1$ and $f_2$ to provide a first digital channel signal adjacent said pair of analog channel signals, said first digital channel signal having a bandwidth substantially equal to $\omega$;

means for modulating a fourth carrier of a frequency $f_4$ above $f_1$ and $f_2$ to provide a second digital channel signal adjacent said pair of analog channel signals, said second digital channel signal having a bandwidth substantially equal to $\omega$; and means for combining said analog and digital channel signals to provide a multiplex of different information channels for transmission over a communications path;

wherein said first and second digital channel signals are separated in said multiplex by said pair of adjacent analog channel signals.

9. Apparatus in accordance with claim 8 further comprising:

means for providing additional analog and digital channel signals in said multiplex;

wherein successive digital channel signals in said multiplex are separated by at least two adjacent analog channel signals.

10. Apparatus in accordance with claim 9 further comprising means for maintaining the power levels of said analog and digital channel signals substantially equal.

11. Apparatus in accordance with claim 8 further comprising means for maintaining the power levels of said analog and digital channel signals substantially equal.

12. Apparatus in accordance with claim 8 wherein said analog and digital channel signals comprise amplitude modulated carriers.

13. Apparatus in accordance with claim 8 wherein said analog and digital channel signals comprise different television program signals.

14. Apparatus in accordance with claim 13 wherein said bandwidth $\omega$ is at least about 6 MHz.

* * * * *